United States Patent Office 3,804,894
Patented Apr. 16, 1974

3,804,894
3-[4-(3-HYDROXY-2,4,6-TRIIODOPHENOXY)-
PHENYL]ALANINE
Jack Bernstein, New Brunswick, and Francis Alexander Sowinski, Edison, N.J., assignors to E. R. Squibb & Sons, Inc., Princeton, N.J.
No Drawing. Filed Apr. 27, 1972, Ser. No. 248,276
Int. Cl. C07c 101/72
U.S. Cl. 260—519     3 Claims

ABSTRACT OF THE DISCLOSURE

The compound 3-[4-(3-hydroxy-2,4,6-triiodophenoxy)-phenyl]alanine, which is useful in radiographic visualization of the subarachnoid space, ventricles of the brain, tracheo-bronchial tree and lymph vessels and compositions thereof are reported.

BACKGROUND AND DESCRIPTION

Considerable effort has been expended in order to produce radiopaque substances and compositions which can be injected into the subarachnoid space, the ventricles of the brain, tracheobronchial tree, lymph vessel and elsewhere for visualization of such systems. Since numerous requirements must be met in order to have a useful composition of this type, such as high iodine content to enable detection at low doses, low toxicity, high stability and ease of preparation and purification, the search for improved agents for these purposes is a continuing one.

This invention relates to a new compound useful as a radiographic contrast agent having the formula:

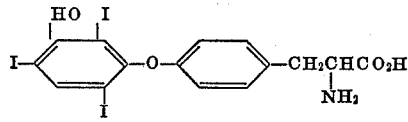

In addition, useful compositions and methods for their administration are disclosed.

The novel compound of this invention is prepared by the following reaction sequence:

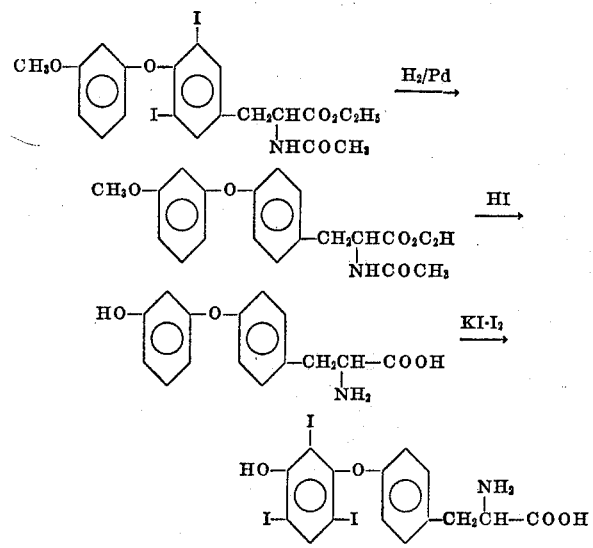

The compound isolated is a monohydrate which may also be used as a radiographic contrast agent. In addition, the compound of this invention contains an asymmetric center and thus may exist in a D form or an L form, or mixtures thereof. While the L isomer is preferred, the D isomer as well as the mixture may also be employed in the radiographic contrast compositions.

The compositions containing the 3-[p-(3-hydroxy-2,4,6-triiodophenoxy)phenyl]alanine more specifically find utility as encephalomyelographic contrast materials. In addition to being useful for visualization of the spinal cord and ventricles of the brain, the compositions also find utility in visualizing the tracheobronchial tree and the lymph vessels.

Thus the compound is suspended or dissolved in a sterile physiologically acceptable vehicle for injection or instillation. The composition may be an aqueous suspension or oil solution depending upon the use to which it is put. Similarly, the concentration of the compound may vary with the use, e.g., in the range of about 100 to 500 mg./ml. Suspending agents, chelating agents, preservatives and the like may be included as the composition requires. However, the concentration in the suspending fluid for visualization by radiography is in the range of about 100 to 500 mg./ml., the preferable range is about 400 to 500 mg./ml. For example, for use in encephalomyelography, the sterile compound is suspended in either bank-filtered cerebrospinal fluid or fluid withdrawn at the time of performing the radiography. For injection within the subarachnoid space or the ventricles of the brain an 18 gauge needle may be employed. The procedure of choice in taking myelograms or ventriculograms is to withdraw an amount of spinal or ventricular fluid in which the compound is homogeneously suspended and then the liquid suspension is reinjected. Generally about 2 to 10 ml. of fluid are involved.

As an alternative, said compound may be suspended in a material, such as Elliot's Solution A (0.9% sodium chloride, 0.3% potassium chloride, 0.2% calcium chloride, 0.3% magnesium sulfate, 1% dextrose in water—w./v.), Ringer's solution (0.65% sodium chloride, 0.14% potassium chloride, 0.012% calcium chloride, 0.02% sodium bicarbonate, 0.001% monosodium phosphate, in water—w./v.), Locke's solution (0.9% sodium chloride, 0.024% calcium chloride, 0.042 potassium chloride, 0.01–0.013 sodium bicarbonate, 0.1 dextrose in water—w./v.), Locke's solution (citrated) (0.92% sodium chloride, 0.05% potassium chloride, 0.01% calcium chloride, 1% sodium citrate in water—w./v.) and Kreb's solution in the concentration indicated above. An isotonic suspension is desired, and most any vehicle capable of achieving this may be employed. It also should be noted that the concentrations of the components of Elliot's solution A, Ringer's, Locke's, Locke's citrated and Kreb's solutions may be varied somewhat, such as ±10% provided the general characteristics of the solution are maintained. It is generally desirable to withdraw the same amount of spinal or ventricular fluid as is to be replaced by an equivalent amount of the contrast medium.

For bronchography, a more viscous suspension which does not diffuse into the alveoli is used. For this purpose there is used a sterile aqueous suspension containing about 100 to 500 mg./ml., preferably 400 to 500 mg./ml. of said compound along with about 1 to 2% by weight of a physiologically acceptable thickening agent such as sodium carboxymethyl cellulose, or the like. This suspension is instilled into the specific area of the tracheobronchial tree by a catheter.

An oil dispersion may be used for lymphangiography. The compound is dispersed in a physiologically acceptable low viscosity natural or synthetic oil, such as vegetable oil (cottonseed, flaxseed, peanut, etc.) or ethyl oleate, ethyl palmitate, ethyl stearate, etc. The dispersion is injected into the lymph vessels, previously outlined by subcutaneous injection of visible dye, with a small needle of the order of 28 or 29 gauge.

The invention will be described in greater detail in conjunction with the following examples.

EXAMPLE 1

L-3-[4-(m-hydroxyphenoxy)phenyl]alanine ethyl ester

A solution of 1.0 g. (0.0016 mole) of L-N-acetyl-3-[3,5-diiodo-4-(m-methoxyphenoxy)phenyl]alanine ethyl ester (J. Med. Chem. 14 (1971) 1199) in 25 ml. of abs. ethanol is hydrogenated at an initial pressure of 60 p.s.i. of hydrogen in the presence of 0.5 g. of palladized charcoal (10% Pd) and 1.0 g. of magnesium oxide. The theoretical uptake of hydrogen is achieved after shaking for 1 hour and the reduction mixture is filtered, concentrated to dryness and the residue taken up in chloroform. The solution is filtered, washed with water, dried ($MgSO_4$), and reconcentrated to give a quantitative yield of pale yellow viscous oil.

*Analysis.*—Calcd. for $C_{20}H_{23}NO_5$ (percent): C, 67.20; H, 6.49; N, 3.92. Found (percent): C, 67.14; H, 6.26; N, 3.62.

Treatment with hexane gives colorless crystals, after prolonged standing at room temperature, M.P. about 62–64°.

EXAMPLE 2

L-3-[4-(m-hydroxyphenoxy)phenyl]alanine

A solution of 9.0 g. (0.003 mole) of the L-N-acetyl-3-[4-(m-methoxyphenoxy)phenyl]alanine ethyl ester in 40 ml. of a mixture of equal parts of freshly purified hydroiodic acid and glacial acetic acid is heated under reflux for 8 hours. The reaction mixture is then concentrated from a warm water bath (45°) under reduced pressure. The light colored syrup is redissolved in 50 ml. portions of $H_2O$ twice and each time reconcentrated to dryness.

The residue from the final concentration is redissolved as before, treated with Darco, filtered, and the pH adjusted until just acid to Congo red. The resulting colorless crystals are filtered to give about 6.9 g. (98%) of product, M.P. 248–250° d. For analysis, a sample is recrystallized from a large volume of methanol, M.P. about 252–253° d.

*Analysis.*—Calcd. for $C_{15}H_{15}NO_4 \cdot H_2O$ (percent): C, 61.84; H, 5.88; N, 4.81. Found (percent): C, 61.75; H, 5.77; N, 4.75.

EXAMPLE 3

L-3-[4-(3-hydroxy-2,4,6-triiodophenoxy)phenyl]alanine

An ice cooled, stirred solution of 6.9 g. (0.024 mole) of L-3-[4-(m-hydroxyphenoxy)phenyl]alanine in 75 ml. of 35% aqueous methylamine is treated during 1 hour with 75 ml. (0.158 mole) of a 0.90 molar iodine-potassium iodide solution, stirred for 1 hour, and kept overnight at 5°. After decolorizing by the addition of small portions of sodium bisulfite, the reaction mixture is filtered, the pH adjusted to 5.0, and the flocculent crystals filtered. The product is reprecipitated by solution in 200 ml. of a 1:2 mixture: of alcohol and water made 0.25 molar with sodium hydroxide then again adjusting the pH to about 5.0 with dilute hydrochloric acid to give about 12.1 g. (78%) of pale yellow powder, M.P. about 196–197° d.

*Analysis.*—Calcd. for $C_{15}H_{12}I_3NO \cdot H_2O$ (percent): C, 26.93; H, 2.11; I, 56.91; N, 2.0. Found (percent): C, 27.04; H, 2.13; I, 56.98; N, 2.08.

EXAMPLE 4

Elliot's Solution A is prepared by thorough admixture of the following ingredients. Sterile substances are used and admixed under aseptic conditions.

| | Gm. |
|---|---|
| Sodium chloride | 9.0 |
| Potassium chloride | 0.3 |
| Calcium chloride | 0.2 |
| Magnesium sulfate | 0.3 |
| Dextrose | 1.0 |
| Water, qs.: 1 liter. | |

600 gm. of sterile crystalline 3-[4-(3-hydroxy-2,4,6-triiodophenoxy)phenyl]alanine are suspended in the solution. The mixture is mixed under sterile conditions until a homogeneous suspension is obtained. The suspension is filled into sterile bottles and sealed.

EXAMPLE 5

A sterile aqueous suspension is prepared by thoroughly admixing the following ingredients until a homogeneous suspension is obtained:

| | Gm. |
|---|---|
| 3 - [4 - (3 - hydroxy - 2,4,6 - triiodophenoxy)phenyl]alanine | 400 |
| Sodium carboxymethyl cellulose (medium viscosity) | 10 |
| Methyl paraben | 1 |
| Propyl paraben | 0.1 |
| Disodium edetate | 0.4 |
| Water, qs.: 1 liter. | |

The suspension is filled into sterile bottles and sealed.

EXAMPLE 6

250 gm. of 3-[4-(3 - hydroxy - 2,4,6 - triiodophenoxy)phenyl]alanine are dispersed in 1 liter of ethyl oleate. The dispersion is filled into sterile bottles and sealed.

For the preparation of a suspension using cerebrospinal fluid as diluent, dry sterile 3-[4-(3-hydroxy-2,4,6-triiodophenoxy)phenyl]alanine is sealed in sterile vials each containing up to 1 gm. and sealed.

What is claimed is:
1. The compound 3-[4 - (3 - hydroxy-2,4,6 - triiodophenoxy)-phenyl]alanine or hydrates thereof.
2. The L isomeric forms of the compounds of claim 1.
3. The D isomeric forms of the compounds of claim 1.

References Cited

Journal of Medicinal Chemistry, vol. 14 (1971), p. 1199.

Selenkow et al., Physiological Reviews, vol. 35 (1955). pp. 444–63.

LORRAINE A. WEINBERGER, Primary Examiner

P. J. HAGAN, Assistant Examiner

U.S. Cl. X.R.

424—5

(5/69)

UNITED STATES PATENT OFFICE
CERTIFICATE OF CORRECTION

Patent No. 3,804,894  Dated April 16, 1974

Inventor(s) Jack Bernstein and Francis Alexander Sowinski

It is certified that error appears in the above-identified patent and that said Letters Patent are hereby corrected as shown below:

Column 1, line 51, "$CH_2CHCO_2C_2H$" should read --$CH_2CHCO_2C_2H_5$--.

Column 2, line 36, "0.14%" should read --0.014%--.

Column 2, line 38, "phosphate, in water — " should read --phosphate, [0.2% dextrose] in water — --.

Column 3, the title of example 1 should read --L-N-Acetyl-3-[4-(m-methoxyphenoxy)phenyl]alanine, ethyl ester--.

Column 3, line 30, "0.003" should read --0.033--.

Signed and sealed this 10th day of September 1974.

(SEAL)
Attest:

McCOY M. GIBSON, JR.
Attesting Officer

C. MARSHALL DANN
Commissioner of Patents